United States Patent [19]

Chang et al.

[11] Patent Number: 5,504,886
[45] Date of Patent: Apr. 2, 1996

[54] SYSTEM AND METHOD FOR APPLYING USER SUPPLIED RELATION DEFINITIONS TO APPLICATION FILES FOR A RELATIONAL DATABASE

[75] Inventors: David Y. Chang, Austin, Tex.; Timothy R. Malkemus, Unionville, Canada

[73] Assignee: International Business Machines Corporation, Armonk, N.Y.

[21] Appl. No.: 86,785

[22] Filed: Jul. 2, 1993

[51] Int. Cl.$^6$ ................................................ G06F 17/30
[52] U.S. Cl. .................................. 395/600; 364/DIG. 1; 364/282.1; 364/283.4
[58] Field of Search .................................... 395/600, 500

[56] References Cited

U.S. PATENT DOCUMENTS

| | | | |
|---|---|---|---|
| 4,506,326 | 3/1985 | Shaw et al. | 395/700 |
| 4,688,195 | 8/1987 | Thompson et al. | 395/12 |
| 4,791,561 | 12/1988 | Huber | 395/600 |
| 4,905,138 | 2/1990 | Bourne | 395/650 |
| 4,930,071 | 5/1990 | Tou et al. | 395/600 |
| 4,931,928 | 6/1990 | Greenfield | 395/600 |
| 5,117,349 | 5/1992 | Tirfing et al. | 395/600 |
| 5,129,086 | 7/1992 | Coyle, Jr. et al. | 395/650 |
| 5,297,279 | 3/1994 | Bannon et al. | 395/600 |
| 5,367,675 | 11/1994 | Cheng et al. | 395/600 |
| 5,379,419 | 1/1995 | Heffernan et al. | 395/600 |
| 5,394,546 | 2/1995 | Hanatsuka | 395/600 |

OTHER PUBLICATIONS

"Power Tools", IBM Technical Disclosure Bulletin, New York, U.S., Sep., 1989, pp. 262–265.
"A Logical Table For User Defined Columns In Relational Databases", IBM Technical Disclosure Bulletin, New York, U.S. (Apr. 1992).
"User–Defined Logical Relationship In Visual Query", IBM Technical Disclosure Bulletin, New York, U.S., Nov., 1990, pp. 221–222.
"Next–Generation Database Systems," Communications Of The ACM, Oct., 1991, vol. 34, No. 10, pp. 95–109.
L. M. Haas et al., "Starburst Mid–Flight: As The Dust Clears," Research Report, New York, U.S., Jan. 22, 1990, pp. 1–29.

*Primary Examiner*—Paul V. Kulik
*Attorney, Agent, or Firm*—Jeffrey S. LaBaw; Andrew J. Dillon

[57] ABSTRACT

Disclosed is a system and method for applying structured query language on user application files not conforming to the definition of a base relation of a relational database management system. A relational database management system has a runtime supervisor and a data manager. For the use of the data manager a plurality of library procedures generalized for manipulation of user application files are provided installed with the database management system. Responsive to user selection, a class for user application files is defined by naming members of a set of the library procedures for use with member application files of the class and by naming the class. Further responsive to user selection, column definitions on an application file within the class are made to create a user defined table. The user defined table corresponds to a specified user application file and to the definition. To create a class of user application files, a class control block is created in which the members of the set of library procedures are named for the class. For the user defined table, a user defined table control block is created in which the column definitions are stored. Both control blocks are accessible to the runtime supervisor for use with an access plan generated from SQL statements. Special structured query language statements are provided for user invocation to define a class of user application files and for providing column definitions, as well as for deleting a class control block and a user defined table control block.

6 Claims, 3 Drawing Sheets

26
| TABLE TYPE NAME | — 40 |
| PROCEDURE FUNCT. NAME | |
| PROCEDURE FUNCT. NAME | — 42 |
| ⋮ | |
| PROCEDURE FUNCT. NAME | |

*Fig. 2*

28
| TYPE NAME | — 44 |
| TABLE NAME | — 46 |
| DATA STREAM NAME | — 48 |
| COLUMN DEF'N | — 50 |
| COLUMN DEF'N | |
| ⋮ | |

*Fig. 3*

34
| TABLE TYPE NAME | — 52 |
| TABLE NAME | — 54 |
| DATA STREAM NAME | — 56 |
| POINTER INTO FILE OR BUFFER | — 58 |
| LOCK ON OR OFF | — 60 |
| OTHER INTERNAL STATUS INDICATIONS AND ACCESS HANDLES | — 62 |
| ⋮ | |

*Fig. 4*

SYSTEM AND METHOD FOR APPLYING USER SUPPLIED RELATION DEFINITIONS TO APPLICATION FILES FOR A RELATIONAL DATABASE

BACKGROUND OF THE INVENTION

1. Technical Field

The invention relates to relational database systems and more particularly to application of Structured Query Language (SQL) to user collected raw data stored in formats other than that for a base relation for a given relational database management system (DBMS). Such user collected raw data includes data objects such as spreadsheets, statistical industrial application data or a data stream on an input/output port. Still more particularly, the invention relates to providing user defined data management service functions, relation definitions and query language extensions to support application of SQL to such data.

2. Glossary

The following definitions are used:

Application or User files. A named set of records stored and processed as unit and having a structure determined by a computer application program.

Atomic data. Representations to which meaning may be assigned, which are physically recorded and which cannot be decomposed into smaller units by a database manager.

Compound Data. Structured combinations of atomic data which can be decomposed by a database manager.

Database. A collection of data with a given structure for accepting, storing, and providing, on demand, data for multiple users.

Data management functions. A set of functions used by a database manager to manipulate a base relation and extended by the invention to application files.

Information. The agreed meaning of data.

Relation. An arrangement of atomic data into columns and unordered rows. Rows should not be duplicated.

Relational database. A database in which all compound data objects are organized as columns and unordered rows.

Structured Query Language (SQL). A set of facilities for defining, accessing and managing a relational database. It is processed linearly.

Table. Commonly used as a synonym for relation, but here used to refer to the user model of base relations and various derived relations, such as views or result tables.

Transaction. A collection of activities involving changes to a database.

Tuple. A row of atomic data instances in a relation. A tuple may correspond to a record or segment in a nonrelational database structure.

View. A virtual or derived relation which, prior to the present invention, was defined in terms of base relations, and represented by its defining expression. A view is here defined in terms of base relations and other files for which a user defined table has been provided.

Virtual relation. Synonymous with derived relation. The result of operations (i.e., a defining expression) carried out on one or more base relations and application files but not itself constituting compound data. It is represented to a user as a table.

User defined table. The user model of an application file and definitional data structures comprising a set of user defined data management functions for a user defined table type and column descriptions for the application file.

User defined table type. A category for one or more application files defined by a set of use defined data management functions.

3. Description of the Prior Art

Relational database management systems were traditionally applied in fields such as insurance, banking and personnel. Their extension to areas such as engineering databases has been hampered by the lack of capacity of venders of relational database products to provide increasingly complex data types and user defined functions.

SQL is, as of 1993, the most widespread user interface language used with relational database management systems. Its application to user collected raw data files, such as .spread sheets, has however been constrained by the need to conform such files to a relation definition cognizable to specific relational database products. Import/export tools have been used to generate conforming files or base relations from application files for insertion to a database.

Import/export tools are typically application specific programs provided by vendors, or written by database users. Vendor supplied and supported import/export tools are comparatively rare, being available only for the most popular application programs. For a user to write an import/export tool requires considerable knowledge of the database manager for the particular database system in use.

Even where an import/export tool is available, it is not a cost free solution in terms of data processing efficiency. The import/export tool does 8 not eliminate existence of the application file, which may in fact still be needed. Operation of the import/export tool results in the need to store files of differing format which contain duplicate data. The larger the application file the larger the problem potentially caused by the need to duplicate its data. Import/export tools have also required offline operation and thus cannot be applied to real time communication applications.

SUMMARY OF THE INVENTION

It is therefore one object of the invention to provide a system and method for application of Structured Query Language (SQL) to user collected raw data stored in formats other than that for a base relation for a particular database management system.

It is another object of the invention to allow user definition of data management service functions for types of application files.

The foregoing objects are achieved as is now described. The invention provides a system and method for using structured query language on user application files not conforming to the definition of a base relation for a relational database management system. The relational database management system has a runtime supervisor and a data manager. For the use of the data manager a plurality of library procedures generalized for manipulation of user application files are provided installed with the database management system. Responsive to user selection, a class for user application files is defined by naming members of a set of the library procedures for use with member application files of the class and by naming the class. Further responsive to user selection, column definitions on an application file within the class are made to create a user defined table. The user defined table corresponds to a specified user application file and to the definition. To create a class of user application files, a class control block is created in which the members of the set of library procedures are named for the class. For the user defined table, a user defined table control block is created in which the column definitions are stored. Both control blocks are accessible to the runtime supervisor for use with an access plan generated from conventional SQL statements. Special structured query language statements are provided for user invocation to define a class of user application files and for providing column definitions, as well as for deleting a class control block and a user defined table control block.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates a data structure for a user defined table type control block used by the relational database management system of FIG. 1;

FIG. 3 illustrates a data structure for a user defined table instance control block used by the relational database management system of FIG. 1;

FIG. 4 illustrates a data structure for a user defined table control block used by the relational database management system of FIG. 1;

DETAILED DESCRIPTION OF THE INVENTION

Figure 1:
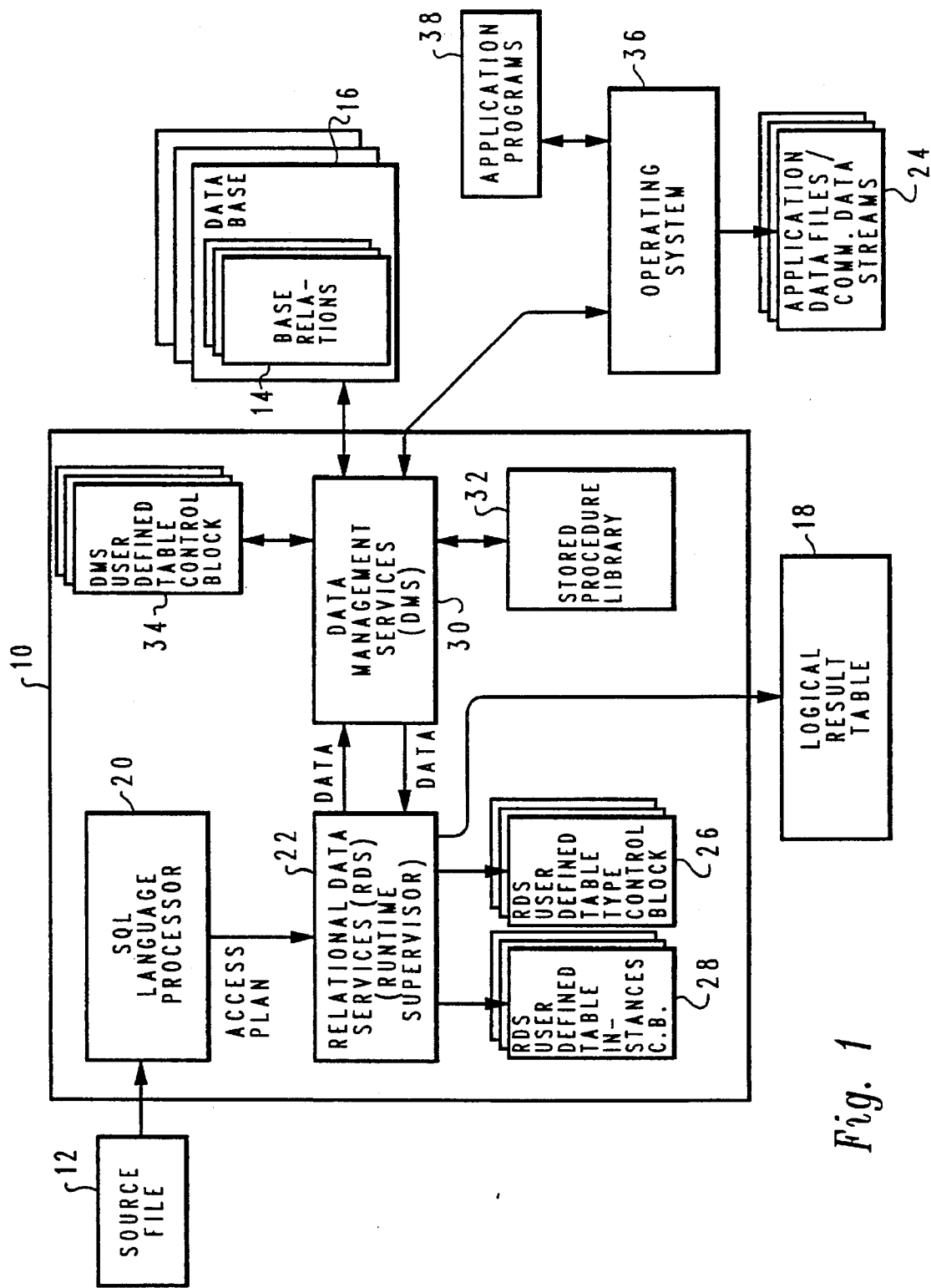
FIG. 1 is a high level functional block diagram of a relational database management system in accordance with the invention.

FIG. 1 is a high level functional block diagram of a relational database management system preferably based upon database products such as the DB2/TWO and DB2/6000 for use with the OS/2 and RS6000/AIX operating systems, respectively. DB2 database products are available from International Business Machines Corporation, Armonk, New York.

Database management system 10 responds to user requests for update, deletion, creation or recovery of records contained in a source file 12. The user request is expressed in SQL statements in file 12 directed to one or more base relations 14 in one of a plurality of databases 16, or to a user application file 24. Results of operations specified with respect to the base relations may be presented to the user as a logical result table 18, e.g., a view.

Database management system 10 includes an SQL language processor 20. SQL processor 20 provides analysis of a host language source file 12. SQL processor 20 replaces all SQL statements from source file 12 with host language CALL statements. Processor 20 in effect compiles the SQL statements into an access plan (sometimes referred to as a database request module), comprising a list of a plurality of control structures, which in turn are used to invoke generalized input/output routines within database manager 30. SQL processor 20 passes the control structures to relational data services 22. The host language CALL statements pass control to Relational Data Services (RDS) 22 at runtime.

Relational Data Services (RDS) 22 is the runtime supervisor in DB2 products and has a number of functions including processing the access plan. RDS 22 uses several control structures when requesting operations of database manager 30. The control structures include a plurality of relational control blocks (not shown) which relate to each of the base relations and derived tables under management of database management system 10. Also among these control blocks are an application control block (not shown) which controls user access to both the base relations and to tools of the database management system, database control blocks (not shown), user defined table type control blocks 26 and user defined table instance control blocks 28. As is well known to those skilled in the art, derived tables such as views and result tables exist only as control blocks defining such derived tables over the base relations. The contents which a user perceives as being part of a view table belong to one or more base relations 14, or, as taught herein, application data files 24.

Relational database services 22 use control blocks to process an access plan which includes operations directed to application data files The contents of user defined table type control blocks 26 and user defined table instance control blocks 28 are described below, but respectively relate to providing tags for stored procedures and to column descriptions for application files. Data are passed from RDS 22 to data manager 30 to carry out operations on the base relations 14 or application files 24.

Data manager (data management services or DMS) 30 provides concurrency control and puts data recovered from a base relation 14 or application file 24 into the appropriate form for return. Data manager 30 performs all normal access method functions and have access to a stored procedure library 32 of generalized routines used to modify, add and delete application file instances 24. Data manager 30 further uses data manager user defined table instance control blocks 34, which correspond one to one with each application file 24 which database management system 10 utilizes. Data manager table instance control blocks 34 are described more fully below. Blocks 34 store various status indications and handles used to implement functions analogous to input/output operations to application files 24. Data manager 30, for purposes of this discussion, includes buffer management functions and provides file locking services.

Data are passed between data manager 30 and RDS 22 as records. Records passed from RDS 22 to data manager 30 specify operations in terms of a user defined name and column information. The records passed back to RDS 22 for relation to a logical table are tuples.

Application files 24 are typically conventional operating system data storage files, but can include such things as input/output buffers, which receive a raw data stream over a communication link, or any other kind of data storage structure. Unless otherwise clear from the context, the term application file is meant to include both operating system files, buffers, or other types of data storage. Where application files 24 represent an operating system storage file, they are generally created by an application program 38 through operating system 36. Accordingly, operating system 36 is illustrated as being interposed between application file 24 and both application program 38 and data manager 30. While this is also true for base relations 14 too, only application files 24 are illustrated as so situated to emphasize that there exist two routes for manipulation of the application files, with one route originating in application programs 38 and the other with source files 12 containing SQL statements. Concurrent modification of application files 24 through SQL statements and application files is blocked through use of file locking services.

FIG. 2 illustrates the structure of an RDS user defined table type control block 26. Block 26 includes a table type name slot 40 and a plurality of procedure function name slots 42.

FIG. 3 illustrates the structure of an RDS user defined table instance block 28. Block 28 includes a table type name slot 44, a table instance name slot 46, a data stream name slot 48 and a plurality of column definition slot 50.

FIG. 4 illustrates the structure of a data manager user defined table control block 34. Block 34 includes a type name slot 52, a table instance name slot 54 for an application file, a data stream name slot 56, a pointer into the application file or input/output buffer 56, a lock on indicator 58, used to lock an application file against concurrent access by another database management system or an application program, and a plurality of other internal status indicators and access handles 60.

Specific examples are given below to further elaborate on the features of the invention. Consider first an application program generating trace data statistics for programs on a computer system. A record structure to store the generated statistics may be set up in the C language as illustrated in Table 1.

TABLE 1

```
struct {
        long    appl_id;              /* application ID */
        long    proc_id;              /* process ID */
        int     rqst_type;            /* request type */
        char    db_pkg[128];          /* database package name */
        int     tran_id;              /* transaction ID */
        int     comp_id;              /* software component ID */
        int     func_id;              /* function ID */
        struct  timeval time_stamp;   /* time stamp */
        int     error_code;           /* error code */
        char    tracedata[128];       /* trace event data */
};
```

The instructions collectively define the members, or the atomic data, of a record, which corresponds to a tuple in a relational database management system. For a plurality of records, each category of atomic data in the structure of Table 1 corresponds to a column in a base relation. To provide database management over the compound data formed by collections of records collected in accord with such a structure, a user defines a table type, here called "tracedata", followed by definition of a specific table instance to refer to the application file where the data has been collected.

Creation of a user defined table type is provided by use of one of four structured query language statements, CREATE TABLETYPE, taught herein. These four statements constitute the only modifications required in the SQL query language. To define a table type the user completes the data structure of FIG. 2 by invoking CREATE TABLETYPE and setting forth a table type name and defining a set of data management functions. The syntax of CREATE TABLETYPE statement is:

CREATE TABLETYPE table-type-name
 (dm-func-definition1, dm-func-definition2, ... ).

The data management function definition, dm-func-definition, has the following format:

dmfuncdefinition=function type stored procedure name

The function type is defined as follows:

| CT: create table | FR: fetch record |
|---|---|
| DT: drop table | IR: insert record |
| LT: close table | DR: delete record |
| OT: open table | UR: update record |
| KT: lock table | VR: validate record |

To create a specific instance of a table a new command CREATE UTABLE is provided. In using CREATE UTABLE the user names the table type to which the new table instance relates and provides a table name for the application file and a data stream name to the application file. The user also specifies column definitions, which allow relational data services 22 to act upon the access plan. The syntax of the CREATE UTABLE statement is as follows:

CREATE UTABLE table-type-name table-name data-stream-name
 (column defintion1, column defintion2, ... ).

As an example of a user defined table, including the data required to fill an RDS user defined table instance control block 28, a spreadsheet type application file is considered. The spreadsheet type file is given the name "tproj" by the user and a path "D:\project\dept.sht". Table 2 sets forth a completed SQL statement using the statement is as follows:

TABLE 2

| CREATE UTABLE spsheet tproj d:¶roject÷ept.shtt | | |
|---|---|---|
| (PROJNO | CHAR(6) | NOT NULL, |
| PROJNAME | VARCHAR(24) | NOT NULL, |
| DEPTNO | CHAR(3) | NOT NULL, |
| RESPEMP | CHAR(6) | NOT NULL, |
| PRSTAFF | DEDIMAL(5,2) | NOT NULL, |
| PRSTDATE | DATE | , |
| PRENDATE | DATE | , |
| MAJPROJ | CHAR(6) | NOT NULL); |

Statements are also provided for destroying table instances and table types. The latter functionality is provided by a DROP TABLETYPE statement, which has the following syntax:

DROP TABLETYPE table-type-name.

Elimination of a tabletype also eliminates all dependent table instances. The last of the new statements is DROP UTABLE, which has the syntax:

DROP UTABLE table-name.

Use of the DROP UTABLE statement results in invalidating or deleting the control blocks associated with the application file identified by the table name.

Once a table type is specified, a user need only identify an application file and define column types and widths using the CREATE UTABLE statement to enable the database management system to manipulate an application file. The database management system then handles application files as if they were base relations. Because application programs may not prevent duplication of records, and the ambiguity attendant the meaning of records resulting from duplication, these application files are not deemed true base relations, but rather user defined tables. The modification required of the SQL language processor is minor, involving the additional syntax defined above for the four new statements.

A set of data management functions are provided for manipulation of an application file and the records stored therein. The tagging of these functions provides part of the definition of each user defined table type. The data management functions are stored procedures installed as library 32. Some ten data management function types are installed as stored procedures with the database management system 10 as function library 32 to carry out the functions needed to support the new and existing SQL statements with respect to a user defined table. The stored procedures are intended to be generic to any data format for the sake of general application. The functions are defined by C language statements in Tables 3–12.

The procedure CREATE TABLE creates a relational table instance control block.

TABLE 3

Function Name:
CREATE TABLE - cretbl
Definition:
    int cretbl(char *table_name, char *raw_data_stream_name,long
    **dm_table_handle)
Definition of Parameters:
"Table_name" is the user defined table name for the application file of
interest; "raw_data_stream_name" is a path and "dm_table_handle" is
the storage that contains the returned table handle.

The procedure DROP TABLE deletes an RMS data table instance control block.

TABLE 4

Function Name:
DROP TABLE - drptbl
Definition:
    int drptbl(long *dm_table_handle)
Definition of Parameters:
"Dm_table_handle" is the data table handle.

The procedure OPEN TABLE creates a data manager data table instance control block of the user defined table. The control block is a link to the data table control block. An RMS data table control block can have multiple data access control blocks. The user defined table must be created first before it can be opened.

TABLE 5

Function Name:
OPEN TABLE - opntbl
Definition:
    int opntbl(long *dm_table_handle, long **dm_acs_handle)
Definition of Parameters:
"Dm_table_handle" is the data table handle; and
"dm_acs_handle" is the storage that contains the returned data
table access handle.

The procedure CLOSE TABLE closes the data table link and frees the user defined table access control block.

TABLE 6

Function Name:
CLOSE TABLE - clotbl
Definition:
    int clotbl(long *dm_acs_handle)
Definition of Parameters:
"Dm_acs_handle" is the data table access handle.

The procedure LOCK TABLE is called to guarantee that a data table will be locked in either READ or EXCLUSIVE mode. READ mode allows the other applications to read data form a user defined table only. EXCLUSIVE mode prohibits the other applications from accessing the user defined table.

TABLE 7

Function Name:
LOCK TABLE - lcktbl
Definition:
    int lcktbl(long *dm_acs_handle, char lock_intent)
Definition of Parameters:
"Dm_acs_handle" is the data table access handle; and
"lock_intent" is the lock intention. R: READ mode,
X: EXCLUSIVE mode.

The procedure FETCH RECORD fetches a record from a user defined table.

TABLE 8

Function Name:
FETCH RECORD - fchrec
Definition:
    int fchrec(long *dm_acs_handle, long *recid, DM_FIELD
    *fld_data[ ], int *num_fld)
Definition of Parameters:
"Dm_acs_handle" is the data table access handle; "recid" is the
storage that contains the record ID; "fld_data" is an array of
DM_FIELD structures. "DM_FIELD" is a data structure
that is defined to store any type of data. Each DM_FIELD
structure stores a column value of a record in the "fld_data"
array; and "num_fld" is the number of entries in the fld_data
array.

The procedure INSERT RECORD inserts a record before the input record ID in the data table.

TABLE 9

Function Name:
INSERT RECORD - insrec
Definition:
    int insrec(long *dm_acs_handle, long *recid, DM_FIELD
    *fld_data[ ], int *num_fld)
Definition of Parameters:
"Dm_acs_handle" is the user defined table access handle; recid is the storage that contains the record ID; "fld_data" is an array of DM_FIELD structures. "DM_FIELD" is a data structure that is defined to store any type of data. Each DM_FIELD structure stores a column value of a record in the fld_data array; and "num_fld" is the number of entries in the fld_data array.

The procedure DELETE RECORD deletes a record from a user defined table.

TABLE 10

Function Name:
DELETE RECORD - delrec
Definition:
        int delrec(long *dm_acs_handle, long *recid)
Definition of Parameters:
"Dm_acs_handle" is the user defined table access handle; and "recid" is the storage that contains the record ID.

The procedure UPDATE RECORD updates a record in a user defined table with a new record value.

TABLE 11

Function Name:
UPDATE RECORD - updrec
Definition:
    int updrec(long *dm_acs_handle, long *recid, DM_FIELD
    *fld_data[ ], int *num_fld)
Definition of Parameters:
"Dm_acs_handle" is the user defined table access handle; "recid" is the storage that contains the record ID; "fld_data" is an array of DM_FIELD structures. DM_FIELD is a data structure that is defined to store any type of data. Each DM_FIELD structure stores a column value of a record in the fld_data array; and "num_fld" is the number of entries in the fld_data array.

The procedure VALIDATE RECORD ID validates a record ID in a raw data table.

TABLE 12

Function Name:
VALIDATE RECORD ID - valrec
Definition:
        int valrec(long *dm_acs_handle, long *recid)
Definition of Parameters:
"Dm_acs_handle" is the data table access handle; and "recid" is the storage that contains the record ID.

Definition of a data management function for a table type is done using the following format:

dm-func-defintion=function-type stored-procedure-name.

All of the slots of a control block 26 for a table type are filled by use of the CREATE TABLETYPE statement with function definitions provided in accord with the above format.

Figure 5:
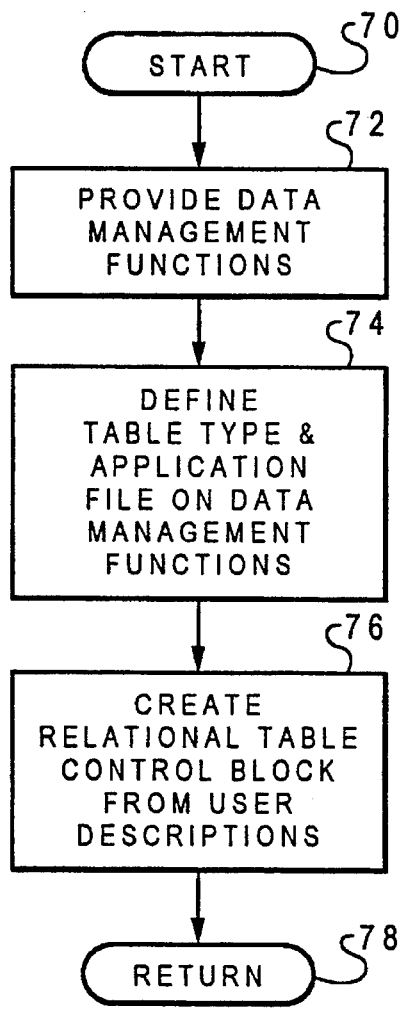
FIG. 5 illustrates a high level logic flowchart of the method of the present invention which may be utilized to set a system up for manipulation of application files.

With reference now to FIG. 5, there is illustrated a high level flowchart of the method of the present invention for setting up for the manipulation of application files in accordance with the present invention. As illustrated, the process begins at block 70 and thereafter passes to block 72. Block 72 depicts the providing of a set of management functions for manipulating application files. This step shall include the naming of a table type and the naming of each data management function. Next, the process passes to block 74. Block 74 illustrates the defining of a table type which includes an application file on the data management function. Next, the process passes to block 76, block 76 illustrates the creation of a relational table control block in response to a user description of columns of an application file and specification of the table type for an application file and further includes the step of installing the column description's user defined table name and table type name in the table control block. Thereafter, the process passes to block 78 and returns.

Figure 6:
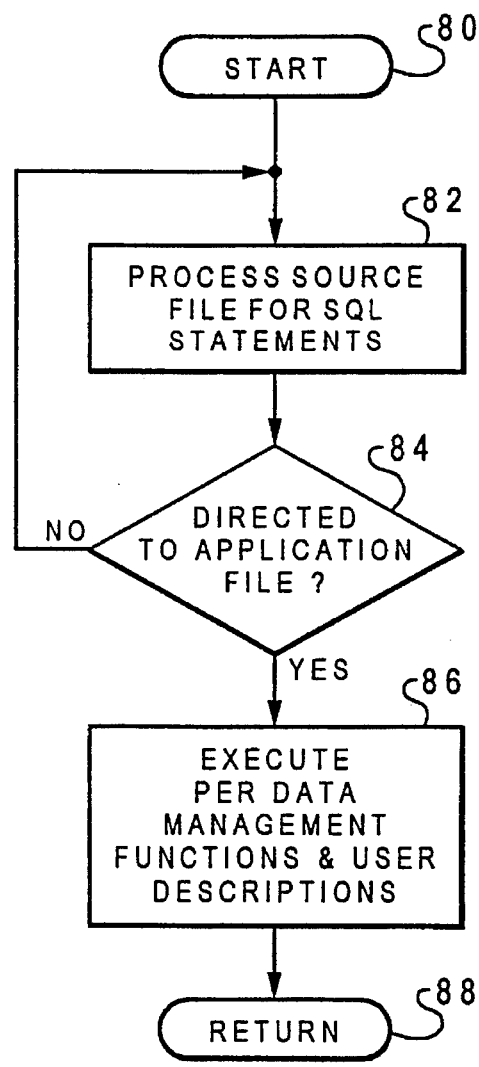
FIG. 6 illustrates a high level logic flowchart of the method of the present invention for manipulating application files.

Referring now to FIG. 6, there is illustrated a high level logic flowchart for the process of manipulating application files in accordance with the method and system of the present invention. As depicted, this process begins at block 80 and thereafter passes to block 82. Block 82 illustrates the processing of a source file for user generated structured query language (SQL) statements. Thereafter, block 84 illustrates a determination of whether or not any of the user generated SQL statements are directed to an application file for which data management functions have been defined. If not, the process returns to block 82 in an iterative fashion. Still referring to block 84, in the event processed SQL statements are directed to such an application file the process passes to block 86. Block 86 illustrates the execution of those SQL statements by applying user definitions of the data management functions for the table type of the application file and the user descriptions of columns for the application file. The process then passes to block 88 and returns.

The invention provides a simplified technique for applying database management to user application files without the duplication of data storage files. The functions of the technique are generalized to allow online treatment of data records as received over communication I/O ports.

While the invention has been particularly shown and described with reference to a preferred embodiment, it will be understood by those skilled in the art that various changes in form and detail may be made therein without departing from the spirit and scope of the invention.

What is claimed is:

1. A method of manipulating application files through a relational database management system on a computer, the application file consisting of tuples of atomic data, the method comprising the steps of:

providing a set of data management functions for manipulating application files;

responsive to user selection, defining a table type including an application file on the data management functions;

responsive to user description of columns of an application file and specification of the table type for the application file, creating a relational table control block for the application file;

processing a source file for user generated structured query language statements; and responsive to processing of a structured query language statement directed to the application file, applying the user definitions of the data management functions for the table type of the application file and user descriptions of columns for the application file in executing the structured query language statement.

2. A method as set forth in claim 1, wherein the step of providing the data management functions for a table type including the application file further includes prompting user:

naming of the table type; and naming of each data management function.

3. A method as set forth in claim 2, wherein the step of creating relational table control block for the application file includes:

installing the column description's user defined table name and table type name in the table control block.

4. A relational database management system comprising:

a structured query language processor for compiling source files containing structured query language statements and generating an access plan from the structured query language statements;

a set of generalized procedures for manipulation of application files and records within application files;

a data manager for executing the generalized procedures to manipulate application files;

means for generating user defined table type control blocks defining a set of functions on the set of generalized procedures for a table type;

means for generating user defined table control blocks for describing domains over data in an application file; and a runtime supervisor for executing the access plan with the user defined table type control blocks and the user defined table control blocks and for thereby directing the data manager to execute particular generalized procedures.

5. A relational database management system as set forth in claim 4, wherein the structured query language processor includes syntax for compiling statements for establishing the user defined table type control blocks and the user defined table control blocks and for destroying the user defined table type and table control blocks.

6. A relational database management system as set forth in claim 5, wherein the application file is a data stream received by a data processing system on an input/output port.

* * * * *

UNITED STATES PATENT AND TRADEMARK OFFICE
CERTIFICATE OF CORRECTION

PATENT NO. : 5,504,886
DATED : April 2, 1996
INVENTOR(S) : Chang et al.

It is certified that error appears in the above-indentified patent and that said Letters Patent is hereby corrected as shown below:

Column 6, line 8: change "dmfuncdefinition = " to --dm_func_definition =--

Column 6, line 39: change "d:¶roject÷ept.shtt" to --d:\project\dept.shtt--

Column 11, line 6: insert --a-- between "creating" and "relational"

Signed and Sealed this

Sixth Day of August, 1996

Attest:

BRUCE LEHMAN

Attesting Officer     Commissioner of Patents and Trademarks